United States Patent
Minagoshi

(10) Patent No.: US 8,241,527 B2
(45) Date of Patent: Aug. 14, 2012

(54) CONDUCTIVE ELASTOMER MATERIAL, AND CONDUCTIVE SHEET AND CONDUCTIVE SEAMLESS BELT EACH MADE OF THE MATERIAL

(75) Inventor: Akira Minagoshi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 303 days.

(21) Appl. No.: 12/745,192

(22) PCT Filed: Dec. 1, 2008

(86) PCT No.: PCT/JP2008/071817
§ 371 (c)(1),
(2), (4) Date: May 27, 2010

(87) PCT Pub. No.: WO2009/084360
PCT Pub. Date: Jul. 9, 2009

(65) Prior Publication Data
US 2010/0301282 A1    Dec. 2, 2010

(30) Foreign Application Priority Data

Dec. 27, 2007    (JP) ................... 2007-336194

(51) Int. Cl.
*H01B 1/24* (2006.01)
*C08L 101/00* (2006.01)
*C08J 5/18* (2006.01)

(52) U.S. Cl. .................... 252/511; 399/176; 399/286

(58) Field of Classification Search .................. 252/502, 252/511; 428/36.92, 220; 399/176, 286; 524/496
See application file for complete search history.

(56) References Cited

U.S. PATENT DOCUMENTS

2007/0112124 A1    5/2007    Noguchi et al.
2010/0247891 A1*   9/2010    Chang et al. .................. 428/220

FOREIGN PATENT DOCUMENTS

| JP | 2005-54095  | A | 3/2005 |
| JP | 2006-225648 | A | 8/2006 |
| JP | 2007-154157 | A | 6/2007 |

* cited by examiner

*Primary Examiner* — Mark Kopec
(74) *Attorney, Agent, or Firm* — Birch, Stewart, Kolasch & Birch, LLP

(57) ABSTRACT

Disclosed is a conductive elastomer material from which a molded material having good conductivity and excellent bending resistance can be obtained. This conductive elastomer material is capable of reducing variations in in-plane electrical resistively of sheet-like molded articles. Specifically disclosed is a conductive elastomer material which is characterized by being obtained by dispersing carbon nanotubes into a base component which is composed only of a thermoplastic elastomer. The conductive elastomer material is also characterized in that the carbon nanotubes have a diameter of 30-300 nm and an aspect ratio of 10-1000, and 0.01-10 parts by mass of the carbon nanotubes are blended per 100 parts by mass of the base component.

2 Claims, No Drawings

CONDUCTIVE ELASTOMER MATERIAL, AND CONDUCTIVE SHEET AND CONDUCTIVE SEAMLESS BELT EACH MADE OF THE MATERIAL

TECHNICAL FIELD

The present invention relates to a conductive elastomer material, and a conductive sheet and a conductive seamless belt both consisting of the conductive elastomer material. As a conductive filler, the conductive elastomer material contains carbon nanotubes.

BACKGROUND ART

As methods for imparting conductivity to a resin, there have been hitherto proposed a method of adding a conductive filler such as metal oxides, conductive carbon black or the like to the resin.

To obtain preferable conductivity in this method, it is necessary to add a comparatively large amount of the conductive filler to the resin. Thus there have occurred various problems including a problem that the original property of a base resin changes.

Such being the case, investigations have been made to develop a resin material capable of displaying a preferable conductivity, even though the mixing amount of the conductive filler is small.

As disclosed in Japanese Patent Application Laid-Open No. 2005-54095 (patent document 1), there was proposed a conductive resin material containing carbon dispersed in a mixture consisting of not less than two kinds of resin.

Description is made in the patent document 1 that as carbon, it is preferable to use fibrous carbon represented by carbon nanotubes whose diameters are not more than 1 µm and vapor-grown carbon fibers. Description is also made in the patent document 1 that even though the mixing amount of the carbon is as small as 0.01 to 10 mass % of the entire material, the conductive resin material is capable of obtaining preferable conductivity having a volume resistivity not more than $10^{10}$ Ω·cm.

But the conductive resin material described in the patent document 1 has a problem that when the conductive resin material containing a small amount of the conductive filler is molded into a sheet-like material such as a film, a variation in the in-plane electric resistance of the sheet-like material is large or the flexing resistance of the sheet is poor in dependence on a dispersion state of the conductive filler.

Patent document 1: Japanese Patent Application Laid-Open No. 2005-54095

DISCLOSURE OF THE INVENTION

Problem to be Solved by the Invention

The present invention has been made in view of the above-described problem. It is an object of the present invention to provide a conductive elastomer material containing carbon nanotubes as a conductive filler. When the conductive elastomer material is molded into a sheet-like material, the carbon nanotubes are uniformly dispersed in a thermoplastic elastomer, which allows the sheet-like material to have a small variation in an electric resistance thereof and an excellent flexing resistance.

Means for Solving the Problem

To solve the above-described problem, the present invention provides a conductive elastomer material in which carbon nanotubes are dispersed in a base component consisting of a thermoplastic elastomer; the carbon nanotubes have diameters of 30 to 300 nm and an aspect ratio of 10 to 1000; and the carbon nanotubes are added to the base component at a ratio of 0.01 to 10 parts by mass for 100 parts by mass of the base component.

In the present invention, as the base component in which the carbon nanotubes are dispersed, only the thermoplastic elastomer is used.

Because the thermoplastic elastomer has rubber-like durability, elasticity, and flexibility and resin-like moldability, the sheet-like material has an excellent flexing resistance when the thermoplastic elastomer is processed into a sheet-like material.

As the thermoplastic elastomer composing the base component, known thermoplastic elastomers can be used. Polyester thermoplastic elastomer, styrene thermoplastic elastomer, chlorinated polyethylene, vinyl chloride thermoplastic elastomer, olefin thermoplastic elastomer, urethane thermoplastic elastomer, and amide thermoplastic elastomer are exemplified.

Of the above-described thermoplastic elastomers, it is preferable to use only the polyester thermoplastic elastomer.

This is based on the finding obtained as a result of the present inventors' experiments made by changing the kind of the thermoplastic elastomer. They have found that when only the polyester thermoplastic elastomer is used as the base component, the carbon nanotubes disperse uniformly therein and that a sheet formed therefrom by dispersing the carbon nanotubes therein has a preferable flexing resistance.

In addition, regarding the carbon nanotubes to be dispersed as a conductive filler in the thermoplastic elastomer, particularly in the polyester thermoplastic elastomer, the present inventors have found that the thickness of the carbon nanotubes gives a big influence on the variation of the electric resistance of the sheet and the flexing resistance thereof and that the above-described problem can be solved by restricting the diameter of the carbon nanotubes to be added to the thermoplastic elastomer to 30 to 300 nm and the aspect ratio to not less than 10.

When a multiwall carbon nanotube is used as the carbon nanotube, the diameter thereof means the diameter of an outermost carbon nanotube.

Therefore the diameters of the carbon nanotubes to be used in the present invention are set to 30 to 300 nm. When the diameter of the carbon nanotube is less than 30 nm, a molded material obtained by extrusion-molding the conductive elastomer material of the present invention has a large variation in the in-plane volume resistivity thereof. On the other hand, when the diameter of the carbon nanotube is more than 300 nm, the molded material has a poor flexing resistance.

The diameter of the carbon nanotube is more favorably 30 to 200 nm and especially favorably 30 to 100 nm.

The aspect ratio (L/D: (L: length, D: diameter)) of the carbon nanotube is set to 10 to 1000. The reason the aspect ratio is set to the above-described range is because when the aspect ratio is less than 10, there is a fear that it is difficult to form a sufficient conductive path by the addition of a small amount of the carbon nanotubes to the thermoplastic elastomer. When the aspect ratio is more than 1000, the molded material consisting of the conductive elastomer material of the present invention has a poor flexing resistance.

The aspect ratio of the carbon nanotube is set to more favorably 10 to 500 and especially favorably 10 to 100.

As the carbon nanotube, a single-wall carbon nanotube consisting of one layer of a tubularly formed graphene sheet in which carbon atoms bonded to one another like a honeycomb spread in a plane, the multiwall carbon nanotube consisting of not less than two concentric and tubular layers, and a coiled single-wall carbon nanotube and a coiled multiwall carbon nanotube. In the present invention, a single-wall construction and a multi-wall construction may be mixedly present in the carbon nanotube.

It is possible to use a carbon material having a structure, a part of which has the structure of the carbon nanotube.

It is also possible to use a carbon nanohorn having a configuration to be obtained by closing one side of the carbon nanotube, a cup-shaped nano-carbon substance having a configuration to be obtained by making the head of the carbon nanohorn hollow, and a carbon nanotube, both sides of which are hollow.

As the carbon nanotube to be used in the present invention, it is possible to use those commercially available or those produced by using a method known in the field to which the present invention relates.

As methods of producing the carbon nanotube, an arc discharge method, a laser evaporation method, a vapor phase growth method, a catalytic hydrogen reduction method of carbon dioxide, a CVD method, a HiPco method of growing the carbon nanotube in a gas phase by allowing a reaction between carbon monoxide and an iron catalyst under a high temperature and a high pressure are listed.

As described above, the mixing amount of the carbon nanotube is set to 0.01 to 10 parts by mass for 100 parts by mass of the thermoplastic elastomer. This is because when the mixing amount of the carbon nanotube is less than 0.01 parts by mass, it is difficult to obtain a desired conductivity. On the other hand, when the mixing amount of the carbon nanotube is more than 10 parts by mass, the sheet-like molded material obtained by processing the thermoplastic elastomer is liable to have a poor flexing resistance.

The mixing amount of the carbon nanotube is set to more favorably 0.5 to 5 parts by mass.

The conductive elastomer material may appropriately contain components other than the above-described components, unless the addition of other components to the thermoplastic elastomer is contrary to the object of the present invention. For example, additives such as a filler, a softener, a compatibilizing agent, an age resistor, an antioxidant, an ultraviolet ray absorber, a lubricant, a pigment, a fire retarding agent, a neutralizing agent, a nucleating agent, and an anti-foam agent are listed.

The conductive elastomer material of the present invention can be produced by using a known method.

Specifically after the thermoplastic elastomer and the carbon nanotube (as desired, other additives) are supplied to a uniaxial extruder, a twin screw extruder or a kneader, the carbon nanotube is dispersed in the thermoplastic elastomer with the thermoplastic elastomer being heated at a temperature, for example, 150 to 250° C. suitable for the kind of the thermoplastic elastomer. By using a kneading machine such as a Henschel mixer, a super mixer or a tumbler-type mixer, a part of the components or all of the components may be kneaded in advance.

It is possible to obtain thermoplastic elastomer molded materials by molding the conductive elastomer material of the present invention into various configurations.

The molding method is not limited to a specific method, but known methods such as an extrusion molding, compression molding, vacuum molding, blow molding, injection molding, and inflation molding may be used. Above all, it is preferable to perform the extrusion molding. Because the use of the extrusion molding allows continuous molding to be performed, the extrusion molding enables an excellent mass production.

It is especially preferable to mold the conductive elastomer material into a conductive sheet or a conductive seamless belt by carrying out the extrusion molding.

Therefore the present invention provides the conductive sheet formed by extrusion-molding the conductive elastomer material in the shape of a sheet. The obtained conductive sheet has a volume resistivity of not more than $10^{11}$ Ω·cm and a variation in an in-plane volume resistivity thereof within $10^{1}$ Ω·cm. The conductive sheet is suitably used as an antistatic film and the like.

The present invention provides the conductive seamless belt formed by extrusion-molding the conductive elastomer material. The obtained conductive seamless belt has a volume resistivity of not more than $10^{11}$ Ω·cm and a variation in an in-plane volume resistivity thereof within $10^{1}$ Ω·cm.

It is preferable to use the conductive seamless belt as a member constructing an image-forming apparatus, for example, a copying machine, a facsimile, a printer, and the like for forming images by carrying out an electrophotographic method or an electrostatic printing method. As the conductive seamless belt, a transport belt, a transfer belt, an intermediate transfer belt, a fixing belt, a developing belt, and a belt for the base of a photoreceptor are listed.

As described above, because in the conductive elastomer material of the present invention, the mixing amount of the carbon nanotube is set to 0.01 to 10 parts by mass for 100 parts by mass of the thermoplastic elastomer, it is possible to set the volume resistivity of the molded material consisting of the thermoplastic elastomer material to not more than $10^{11}$ Ω·cm.

Because the lower limit of the volume resistivity is different according to an applied use, the lower limit cannot be said flatly. But in consideration of the mixing amount of the carbon nanotube, the lower limit of the volume resistivity is about $10^{4}$ Ω·cm.

The volume resistivity of the molded material is more favorably $10^{6}$ to $10^{10}$ Ω·cm.

It is possible to suppress the variation in the in-plane volume resistivity of the conductive sheet of the present invention and the conductive seamless belt thereof within $10^{1}$ Ω·cm. The variation in the volume resistivity means the difference between a maximum volume resistivity and a minimum volume resistivity in those measured at a plurality of the in-plane positions of the molded material.

The reason the variation in the in-plane volume resistivity of the molded material can be suppressed within $10^{1}$ Ω·cm is because the carbon nanotubes can be uniformly dispersed in the thermoplastic elastomer by using the carbon nanotubes having the diameter of 30 to 300 nm and the aspect ratio of 10 to 1000 and by using only the thermoplastic elastomer as the base component.

The variation in the in-plane volume resistivity of the molded product is more favorably within 3.5 Ω·cm.

Because in the conductive seamless belt of the present invention, only the thermoplastic elastomer is used as the base component, and the carbon nanotubes having the above-described diameter and aspect ratio are uniformly dispersed in the thermoplastic elastomer, the flexing resistance of the conductive seamless belt can be enhanced.

More specifically a conductive sheet having a width of 15 mm, a length 150 mm, and a thickness of 100 μm was repeatedly flexed by using MIT folding endurance tester produced by Yasuda Seiki Seisakusho, Ltd. in a constant temperature and humidity condition in which an ambient temperature was 23° C. and a relative humidity was 55% and conditions in which a load was ½ lb, a flexing angle was 135 degrees, and a flexing speed was 175 cpm to measure the number of flexed times before the conductive sheet is broken. As a result, the number of flexed times which indicates the flexing resistance thereof is not less than 30,000 before the conductive sheet is broken.

Effect of the Invention

The specific conductive filler consisting of the carbon nanotube having the diameter of 30 to 300 nm and the aspect ratio of 10 to 1000 is used for the conductive elastomer material of the present invention. The base material consists of only the thermoplastic elastomer. Therefore it is possible to obtain the molded material excellent in its flexing resistance and suppress a variation in the in-plane electric resistance of the molded material.

Further the mixing amount of the carbon nanotubes are set to 0.01 to 10 parts by mass for 100 parts by mass of the thermoplastic elastomer. Therefore the volume resistivity of the conductive elastomer material is not more than $10^{11}$ Ω·cm. Thus the conductive elastomer material is capable of obtaining a favorable conductivity. Therefore the property of the thermoplastic resin serving as the base is not changed. Further it is possible to produce a colorless and transparent molded material.

Furthermore because the thermoplastic elastomer of the present invention can be extruded, the thermoplastic elastomer can be continuously molded and is thus excellent in mass production.

BEST MODE FOR CARRYING OUT THE INVENTION

An embodiment of the present invention is described below.

In a conductive elastomer material, carbon nanotubes having diameters of 30 to 300 nm are dispersed in a polyester thermoplastic elastomer.

As the mixing amount of the carbon nanotube, the carbon nanotube is added to the polyester thermoplastic elastomer at 0.01 to 10 parts by mass for 100 parts by mass. In this embodiment, the carbon nanotube is added to the polyester thermoplastic elastomer at the ratio of 0.5 to 5 parts by mass.

As described above, although the diameter of the carbon nanotube should fall in the range of 30 to 300 nm, the diameter thereof is set to 30 to 100 nm in this embodiment.

Although the aspect ratio of the carbon nanotube should fall in the range of 10 to 1000, the aspect ratio thereof is set to 10 to 100 in this embodiment.

As a base material, only the polyester thermoplastic elastomer is used.

It is possible to use the polyester thermoplastic elastomer having an appropriate grade in hardness, elastic modulus, moldability, and the like according to a property demanded for the conductive elastomer material.

As the polyester thermoplastic elastomer, polyester polyether thermoplastic elastomer and polyester polyester thermoplastic elastomer are exemplified. A plurality of kinds of the polyester thermoplastic elastomers may be mixed with each other.

Above all, the polyester thermoplastic elastomer composed of a high melting point polyester component and a low melting point polyester component is preferable.

More specifically the polyester thermoplastic elastomer having a melting point of not less than 150° C. when a polymer consists of the high melting point polyester component and having a melting point or a softening point of not more than 80° C. when a polymer consists of the low melting point soft segment component is preferable.

As the polyester thermoplastic elastomer, a copolymer composed of a hard segment consisting of polyester having aromatic rings and a soft segment consisting of polyether and/or the polyester is preferable.

As components of the hard segment consisting of the polyester having the aromatic rings, it is possible to use aromatic dicarboxylic acid such as terephthalic acid, isophthalic acid, diphenyl dicarboxylate, 2,6-naphthalene dicarboxylate, esters thereof, glycol having a carbon number of 1 to 25, and ester-forming derivatives.

As the acidic component, it is preferable to use the terephthalic acid. It is preferable to use the terephthalic acid singly, but it is possible to combine the terephthalic acid with other acidic components as necessary. In using the terephthalic acid in combination with other acidic components, it is favorable that the terephthalic acid occupies not less than 70 mol % and more favorable that the terephthalic acid occupies not less than 75 mol % of the entire acidic component.

As the glycol having carbon number of 1 to 25, ethylene glycol, 1,4-butane diol, and the like are exemplified.

Above all, polybutylene terephthalate is preferable as the component of the hard segment consisting of the polyester having the aromatic ring.

As the soft segment consisting of the polyether, polyalkylene ether glycol such as poly(ethylene oxide) glycol, poly(tetramethylene oxide) glycol, and the like are listed. The carbon number of the alkylene portion is not limited to two and four in the exemplified compounds, but is favorably 2 to 20 and more favorably 2 to 10.

It is preferable that in the polyester polyether thermoplastic elastomer, the soft segment consisting of the polyether occupies 15 to 75 mass % of the entire mass.

Because in the polyester polyether thermoplastic elastomer, the elastic modulus of molecular chains which are the soft segment little changes and is stable between a low temperature and humidity state and a high temperature and humidity state, the polyester polyether thermoplastic elastomer has an advantage of decreasing the degree of the dependence of the resistance value of the conductive resin material of the present invention on environment.

As the soft segment consisting of the polyester, it is preferable to use lactones. Of the lactones, caprolactone is most favorable. As other lactones, it is possible to use enan lactone or caprylolactone and not less than two kinds thereof in combination.

In the polyester thermoplastic elastomer, the copolymerization ratio between the aromatic polyester and the lactones can be selected according to a use. But as a standard mass ratio therebetween in the mass ratio, the aromatic polyester/lactones is 97/3 to 5/95 and generally 95/5 to 30/70.

The conductive elastomer material may appropriately contain additives other than the thermoplastic elastomer and the carbon nanotube, unless the addition of the additives to the thermoplastic elastomer is contrary to the object of the present invention.

For example, to improve the mechanical strength of the conductive elastomer material, it is possible to add a filler to the thermoplastic elastomer. As the filler, it is possible to list powder of silica, carbon black, clay, talc, calcium carbonate, dibasic phosphite (DLP), basic magnesium carbonate, alumina, and the like.

It is preferable to add the filler to the thermoplastic elastomer at not more than 15 parts by mass for the entire mass of the conductive elastomer material. This is because although the addition of the filler to the thermoplastic elastomer is effective for improving the tensile strength and tearing strength of the conductive elastomer material, the flexibility thereof deteriorates when a very large amount of the filler is added to the thermoplastic elastomer.

To provide the thermoplastic elastomer material with a moderate degree of flexibility and elasticity, a softener may be added to the thermoplastic elastomer as necessary.

As the softener, oil and a plasticizer are listed. As the oil, it is possible to use mineral oil such as paraffin oil, naphthenic oil, aromatic oil and known synthetic oil consisting of a hydrocarbon oligomer, and process oil. As the synthetic oil, an oligomer of α-olefin, an oligomer of butene, and an amorphous oligomer of ethylene and α-olefin are preferable. As the plasticizer, phthalate-based, adipate-based, sebacate-based, phosphate-based, polyether-based, and polyester-based plasticizers are listed. More specifically dioctyl phthalate (DOP), dibutyl phthalate (DBP), dioctyl sebacate (DOS), and dioctyl adipate (DOA) are listed.

The mixing amount of the softener is not limited to a specific amount, but set to favorably 50 to 400 parts by mass and more favorably 50 to 200 parts by mass for 100 parts by mass of the thermoplastic elastomer. When the mixing amount of the softener is less than the lower limit of the above-described range, it is difficult to obtain the effect which is to be obtained by the addition of the softener to the thermoplastic elastomer. On the other hand, when the mixing amount of the softener is more than the upper limit of the above-described range, the softener may bleed when the conductive elastomer material is processed into a molded material.

The conductive elastomer material of the present invention is produced by carrying out a method described below.

The polyester thermoplastic elastomer, the carbon nanotubes, and desired other additives are supplied to a twin screw extruder. The carbon nanotubes are dispersed in the thermoplastic elastomer with the above-described components being heated at 200 to 250° C. It is preferable to pelletize the obtained conductive elastomer material in consideration of a subsequent molding step.

The obtained conductive elastomer material of the present invention is extruded in the shape of a sheet or a seamless belt at 200 to 250° C. by using a uniaxial extruder to produce the conductive seamless belt.

The conductive seamless belt has a volume resistivity of not more than $10^{11}$ Ω·cm. The variation in the in-plane volume resistivity of the conductive seamless belt is set within $10^1$ Ω·cm. In a flexing resistance test described in examples of the present invention described later, the conductive seamless belt was flexed at not less than 30,000 times before the conductive seamless belt was broken.

The present invention is described in detail below by using the examples. The present invention is not limited to the examples described below.

Examples 1, 2 and Comparison Examples 2, 3

The carbon nanotubes were added to the polyester thermoplastic elastomer at the ratio (numerical values shown in table 1 show part by mass) shown in a table shown below. The carbon nanotubes and the polyester thermoplastic elastomer were dissolved and kneaded at a temperature of 250° C. by using a twin screw extruder. After the kneaded components were extruded with the carbon nanotubes being dispersed in the polyester thermoplastic elastomer, an extruded material was pelletized to obtain the conductive elastomer material.

The formed pelletized conductive elastomer material was extruded at 250° C. by using a uniaxial extruder on which a T die having a width of 150 mm was mounted to form a sheet having a thickness of 100 μm.

Comparison Example 1

The carbon nanotube was not added to the thermoplastic elastomer. After the thermoplastic elastomer was dissolved at a temperature of 250° C. and extruded by using the twin screw extruder, the extruded thermoplastic elastomer was pelletized.

The formed pellet was extruded at 250° C. by using the uniaxial extruder on which the T die having a width of 150 mm was mounted to form a sheet having a thickness of 100 μm.

Comparison Example 4

Except that polybutylene naphthalate which is thermoplastic resin was used instead of the thermoplastic elastomer, a sheet having a thickness of 100 μm was formed by using a method similar to that used in the example 1.

TABLE 1

|  | Example 1 | Example 2 | Comparison example 1 | Comparison example 2 | Comparison example 3 | Comparison example 4 |
|---|---|---|---|---|---|---|
| Thermoplastic elastomer | 100 | 100 | 100 | 100 | 100 |  |
| Thermoplastic resin |  |  |  |  |  | 100 |
| Carbon nanotube A |  |  |  | 2 |  |  |
| Carbon nanotube B | 2 |  |  |  |  | 2 |
| Carbon nanotube C |  | 2 |  |  |  |  |
| Carbon nanotube D |  |  |  |  | 2 |  |
| Volume resistivity | ○ | ○ | x | ○ | ○ | ○ |
| In-plane variation in volume resistivity | ○ | ○ | — | x | ○ | ○ |
| Flexing resistance | ○ | ○ | ○ | ○ | x | x |

Products shown below were used as the components shown in table 1.
Thermoplastic elastomer: polyester thermoplastic elastomer ("Hytrel 2781 (commercial name)" produced by Du Pont-Toray Co., Ltd.)
Thermoplastic resin: Polybutylene naphthalate (Perupuren P560 (commercial name)" produced by Toyobo Co., Ltd.)
Carbon nanotube A: diameter=10 nm, aspect ratio: 50
Carbon nanotube B: diameter=50 nm, aspect ratio: 40
Carbon nanotube C: diameter=100 nm, aspect ratio: 20
Carbon nanotube D: diameter=400 nm, aspect ratio: 20

The following properties of the sheets formed in the examples 1, 2 and the comparison examples 1 through 4 were measured. Results are shown in table 1.

(1) Measurement of Volume Resistivity

The volume resistivity was measured by using a UR probe "Hiresta-up (MCP-HT450) produced by Mitsubishi Chemical Corporation in a constant temperature and humidity condition in which an ambient temperature was 23° C. and a relative humidity was 55% and at a voltage of 100V.

The volume resistivity was measured at two points in a direction perpendicular to a direction in which the prepared sheets were extruded and seven points spaced at intervals of 10 cm in the extrusion direction. Thus the volume resistivity was measured at 14 points in total. The average of the 14 values was set as the volume resistivity. The average values were judged in accordance with the reference shown below.

○: volume resistivity$\leqq 10^{11}$ Ω·cm

X: volume resistivity$> 10^{11}$ Ω·cm (2) In-Plane Variation in Volume Resistivity The difference between a maximum value and a minimum value of the volume resistivities measured at the 14 points in the above-described (1) was taken as the in-plane variation. Each of the difference values was judged in accordance with the reference shown below.

○: maximum value−minimum value$\leqq 10^1$

X: maximum value−minimum value$> 10^1$

The sheet of the comparison example 1 consisted of the thermoplastic elastomer and did not contain the carbon nanotube. Therefore the volume resistivity exceeded $10^{11}$ Ω·cm and was thus shown as "−".

(3) Flexing Resistance

The sheets were punched in the extrusion direction in the shape of a strip having a width of 15 mm and a length of 150 mm to form samples.

The samples were repeatedly flexed by using MIT folding endurance tester produced by Yasuda Seiki Seisakusho, Ltd. in a constant temperature and humidity condition in which an ambient temperature was 23° C. and a relative humidity was 55% and conditions in which a load was ½ lb, a flexing angle was 135 degrees, and a flexing speed was 175 cpm to measure the number of flexed times before breakage. Based on the number of flexed times before the samples were broken, the flexing resistance of each sample was judged in accordance with the reference shown below.

○: Number of flexed times before breakage>30,000 times

X: Number of flexed times before breakage$\leqq$30,000 times

It was confirmed that in the molded material of the comparison example 2 in which the diameter of the carbon nanotube was 10 nm which is smaller than 30 nm, the molded material had a large variation in its in-plane volume resistivity.

It was confirmed that in the molded material of the comparison example 3 in which the diameter of the carbon nanotube was 400 nm which is larger than 300 nm, the molded material had a poor flexing resistance.

It was confirmed that in the molded material of the comparison example 4 in which the thermoplastic resin was used instead of the thermoplastic elastomer, the molded material had a poor flexing resistance.

On the other hand, it was confirmed that in the molded material of each of the examples 1 and 2 in which the diameter of the carbon nanotube was in the range of 30 to 300 nm, each molded material had an excellent flexing resistance and a small variation in the in-plane electric resistance thereof.

What is claimed is:

1. A conductive seamless belt formed by extruding a conductive elastomer material as a sheet,
    wherein in said conductive elastomer material, carbon nanotubes are dispersed in a base component consisting of a polyester thermoplastic elastomer; said carbon nanotubes have diameters of 50 to 100 nm and an aspect ratio of 20 to 40; and said carbon nanotubes are added to said base component at a ratio of 0.5 to 5 parts by mass for 100 parts by mass of said base component,
    said sheet consisting of said conductive elastomer material has a volume resistivity of $10^6$ to $10^{10}$ Ω·cm and a variation in an in-plane volume resistivity thereof within $10^1$ Ω·cm,
    in a flexing test conducted at a load of ½ lb, a flexing angle of 135 degrees, and a flexing speed of 175 cpm to examine a flexing resistance of said sheet, a number of flexed times is not less than 30,000 before said sheet is broken.

2. The conductive seamless belt according to claim 1, wherein said polyester thermoplastic elastomer is a copolymer composed of a hard segment consisting of polyester having aromatic rings and a soft segment consisting of polyether and/or polyester.

* * * * *